United States Patent
Philipp et al.

(10) Patent No.: US 9,676,562 B2
(45) Date of Patent: Jun. 13, 2017

(54) PRODUCT-FLOW REGULATOR

(71) Applicant: Rotzinger AG, Kaiseraugst (CH)

(72) Inventors: Kurt Philipp, Grenzach-Wyhlen (DE); Daniel Backhaus, Altendorf (CH)

(73) Assignee: Rotzinger AG, Kaiseraugst (CH)

( * ) Notice: Subject to any disclaimer, the term of this patent is extended or adjusted under 35 U.S.C. 154(b) by 0 days.

(21) Appl. No.: 14/417,845

(22) PCT Filed: Aug. 6, 2013

(86) PCT No.: PCT/EP2013/066479
§ 371 (c)(1),
(2) Date: Jan. 28, 2015

(87) PCT Pub. No.: WO2014/023730
PCT Pub. Date: Feb. 13, 2014

(65) Prior Publication Data
US 2015/0158677 A1    Jun. 11, 2015

(30) Foreign Application Priority Data

Aug. 7, 2012 (CH) ........................... 1293/12

(51) Int. Cl.
*B65G 1/00* (2006.01)
*B65G 47/51* (2006.01)
*B65G 47/64* (2006.01)

(52) U.S. Cl.
CPC ........ *B65G 47/5113* (2013.01); *B65G 47/643* (2013.01)

(58) Field of Classification Search
CPC ................................................ B65G 47/5113
(Continued)

(56) References Cited

U.S. PATENT DOCUMENTS 3,050,200 A * 8/1962 Siempelkamp .......... B27N 3/22
                                                198/435
4,867,299 A * 9/1989 Fukuoka .............. B65G 47/643
                                                198/435
(Continued)

FOREIGN PATENT DOCUMENTS

DE         299 08 724 U1     9/1999
DE      20 2008 006 822 U1   8/2008
(Continued)

OTHER PUBLICATIONS

International Search Report Issued Oct. 11, 2013 in PCT/EP13/066479 Filed Aug. 6, 2013.

*Primary Examiner* — Leslie A Nicholson, III
*Assistant Examiner* — Lester Rushin
(74) *Attorney, Agent, or Firm* — Oblon, McClelland, Maier & Neustadt, L.L.P.

(57) ABSTRACT

The product flow regulator is used for decoupling an incoming flow of piece-goods from a downstream device for further processing. It comprises a stationary intermediate storage with a plurality of store levels, an infeed-side elevator with one or more transport levels for taking products arriving on conveyors to intermediate storage and a discharge-side elevator for removing the temporarily stored products and delivering them to forwarding conveyors. A buffer device is arranged upstream from these elevators on the infeed side and downstream from these elevators on the discharge side.

11 Claims, 4 Drawing Sheets

Figure 1:
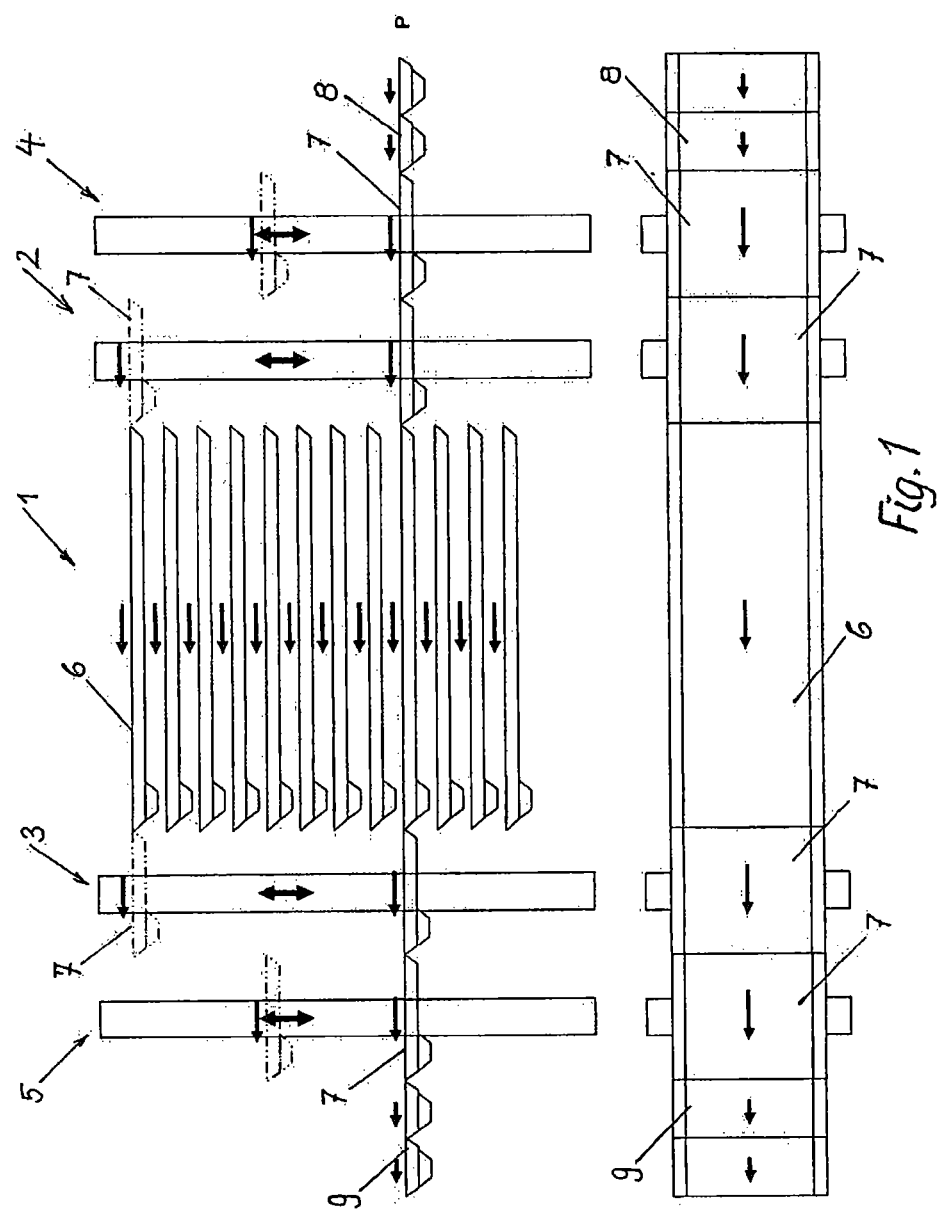

(58) Field of Classification Search
 USPC .................................. 198/347.1, 347.4, 435
 See application file for complete search history.

(56) References Cited

U.S. PATENT DOCUMENTS

2010/0108464 A1   5/2010  Davi et al.
2010/0314218 A1  12/2010  Silberbauer

FOREIGN PATENT DOCUMENTS

| EP | 2 263 956 A1 | 12/2010 |
|----|--------------|---------|
| FR | 1 234 974    | 7/1960  |
| FR | 2223945 A5   | 10/1974 |
| FR | 2 924 104    | 5/2009  |
| JP | 2 66020      | 3/1990  |
| WO | 2008 095861  | 8/2008  |

\* cited by examiner

PRODUCT-FLOW REGULATOR

The invention relates to an apparatus and a method for decoupling an incoming flow of piece-goods from a downstream device for further processing.

Such methods and product flow regulators are known and used, for example, between a production device and a packaging device. A packaging device is usually set up such that it has a packaging output that is greater than the output of the production device in order to prevent product backups and thus operational disruptions. If an interruption occurs in the operation of the packaging device, however, the production device can be switched off, but that is sometimes only possible with a substantial delay, because the products in the process of being manufactured must be removed from the production device in any case. This would result in a backup of production and, in the case of foodstuff production, waste as well in many cases. For this reason, measures are taken in the case of such product flows to decouple the product flow coming from a production device, for example, from the product flow fed to a packaging device.

Product flow regulators of this type usually have an intermediate storage in which the products are temporarily stored for a certain length of time and infeed devices for feeding the incoming products into intermediate storage and discharge devices for removing the products from intermediate storage and forwarding them.

The known intermediate storages have a plurality of shelf spaces on which the products are placed and from which they are removed after a predetermined time period. Intermediate storages can either be embodied such that the shelf spaces are moved to the infeed and discharge devices, in the manner of the known chain boxes for example, in which enclosures hanging on chains have several shelf spaces arranged one over the other.

Intermediate storages can also be set up such that the shelf spaces are stationary and the products are brought by means of an elevator from the level at which they arrive to the level at which they are temporarily stored and then picked up from the intermediate storage levels and brought to the forwarding level.

For both types of intermediate storage, the products arriving in a uniform flow must be grouped in formations between which a sufficient gap is formed which enables movement of the storage or elevator. The suitable measures for that are also known from the prior art.

Despite ongoing optimizations of the structural solutions and of the controls, the known product flow regulators are no longer suited to the demands placed on processing speed, which will further increase in the future. It is therefore the object of the invention to increase the input and output speeds of product flow regulators so that they also meet future demands.

According to the invention, this is achieved by the characterizing features of claims 1 and 6.

One thing that is made possible by the buffer device according to the invention arranged upstream from the infeed-side elevator is that the period of time during which the buffer device is being filled is made available to the infeed-side elevator for vertical transport, transferring of products to intermediate storage and returning. As a result, a prebuffer function can be implemented which enables an increase in the work cadence of the infeed-side elevator and hence of the production throughput.

In addition, the transfer of products from the buffer device arranged upstream from the infeed-side elevator to several different levels on the infeed-side elevator has the effect that the infeed-side elevator has less lift height to travel, thus saving time which can be exploited in order to increase throughput.

An analog buffer device is preferably also arranged downstream from the infeed-side elevator, thus enabling commensurate effects and advantages to be achieved.

For example, the buffer devices can be elevators. Alternatively, they can be stationary, in which case they can comprise several stationary heights and a distributing device for this purpose.

In the following, a product flow regulator at a production facility for unpackaged biscuits or the like is described with reference to the enclosed drawings as a preferred exemplary embodiment of the invention.

Figure 2:
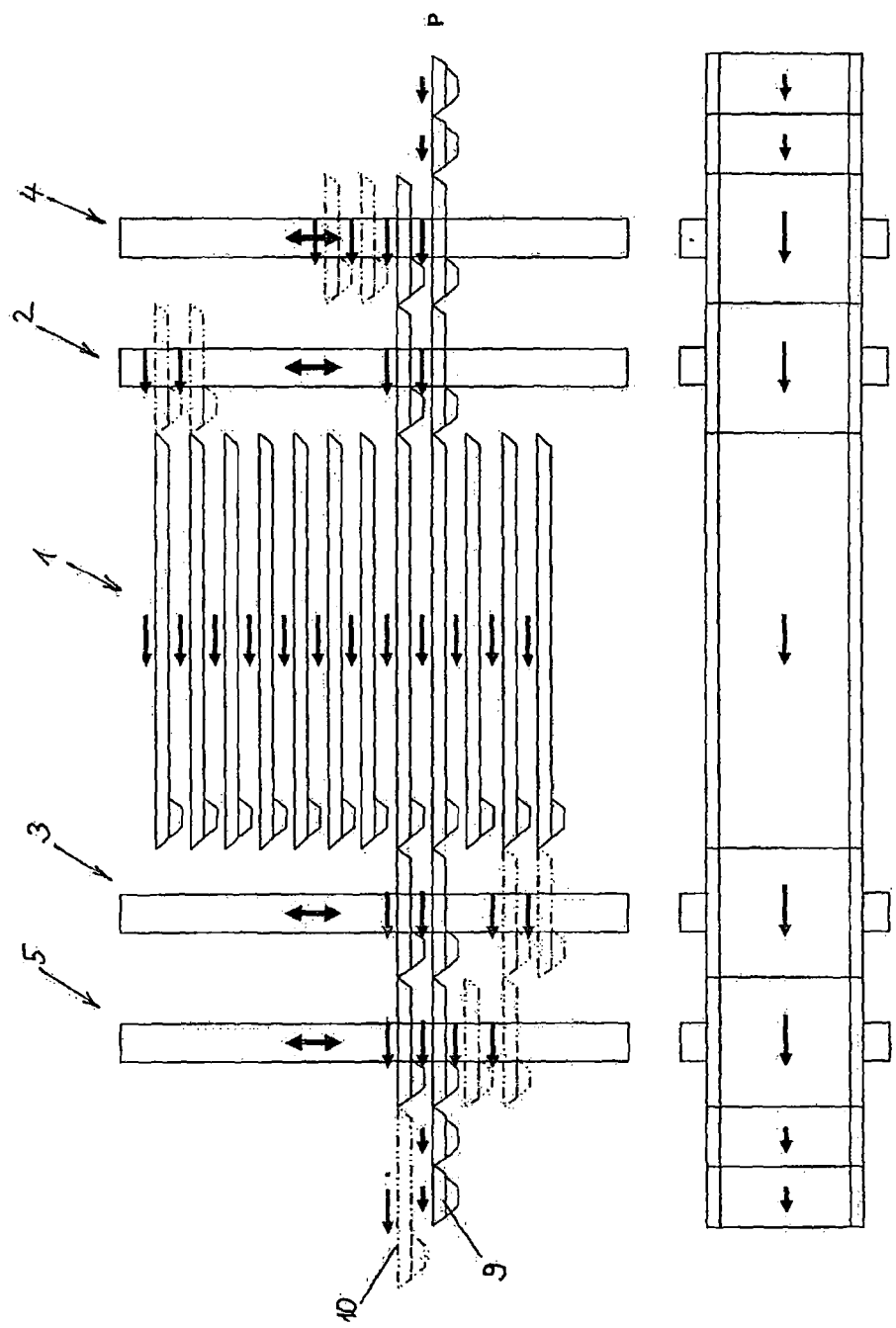
Figure 3:
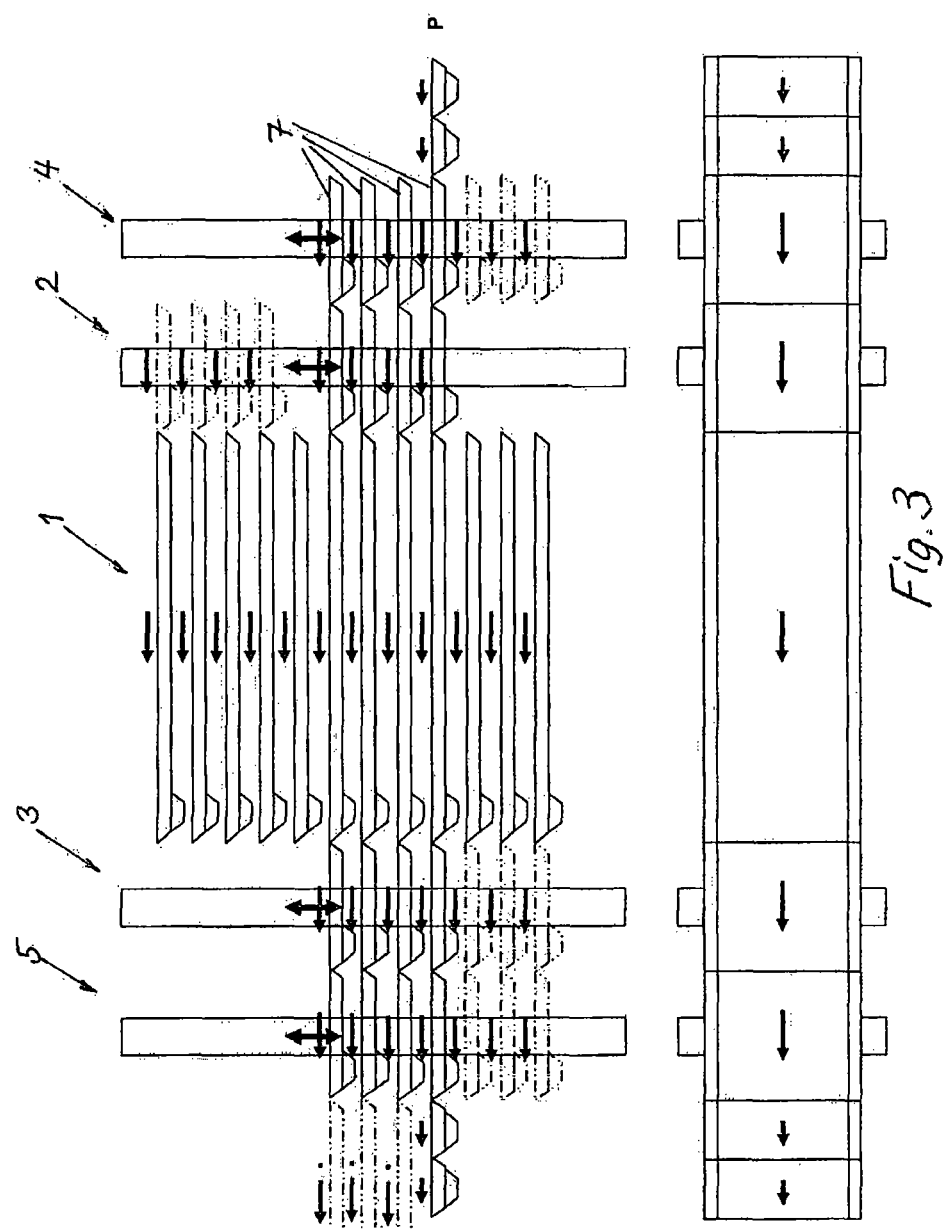
Figure 4:
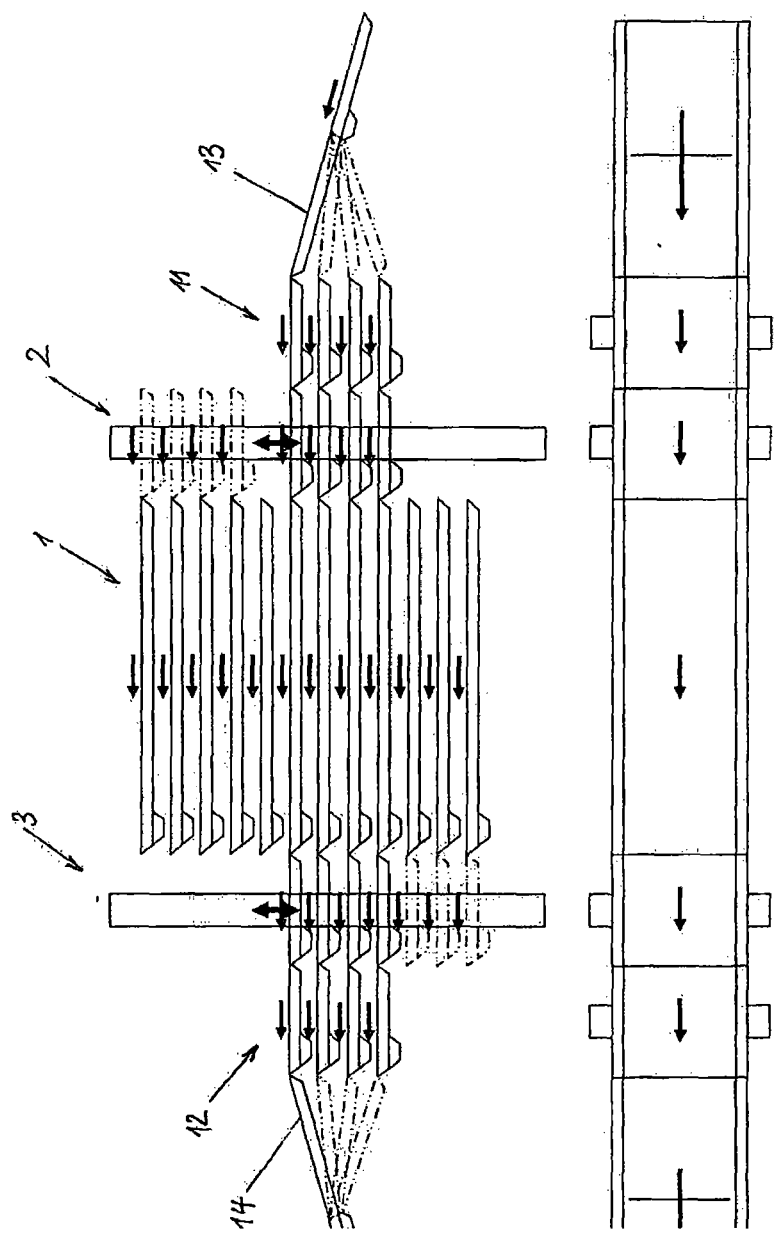

FIG. 1 shows a schematic drawing of a product flow regulator in a side view and top view FIG. 2 shows a corresponding product flow regulator with two elevator levels FIG. 3 shows a corresponding product flow regulator with four elevator levels FIG. 4 shows an embodiment with alternative product infeed and discharge The product flow regulator shown in FIG. 1 for a production facility for products P (biscuits) comprises an intermediate storage 1, an infeed-side elevator 2 and a discharge-side elevator 3. In addition, an additional elevator 4 is arranged in front of the infeed-side elevator 4 when seen in the transport direction which brings about a buffer function that will be described in further detail below. Accordingly, a buffer elevator 5 is arranged after the discharge-side elevator 3.

The intermediate storage has a number of shelving levels arranged one over the other for the products P. The shelving levels consist of conveyor belts 6 which run intermittently, i.e., for the respective duration of the transfer of a group of products located on the elevator, to transfer product from the infeed-side elevator 2 and, when they are filled, optionally rest for a predetermined intermediate storage period. The products are discharged in the same manner but in reverse sequence; that is, groups of products are intermittently transferred to the discharge-side elevator 3 until the respective conveyor belt is empty.

The shelf spaces of the elevators represent transport levels which also consist of conveyor belts 7 running synchronously with the upstream and downstream belts for picking up and delivering products, respectively, and resting during vertical transport. In the drawings, the shelving levels or conveyor belts 7 of the elevators are each shown in two vertical positions, namely in a pickup position and a delivery position.

The infeed-side buffer elevator 4 picks up the products from the belts 8, which deliver the products and group them in formations in a known manner. The time period during which the buffer elevator 4 is being filled is available to the elevator 2 for vertical transport, transferring the products to an intermediate storage level and returning. This constitutes a prebuffer function which enables the work cadence of the elevator 2 and thus the product throughput to be increased.

When the buffer elevator 4 is being filled, it can also perform a vertical transport during the gap between incoming product groups and meets the elevator 2 at half the lift height. As a result of this sequence, the lift heights can be reduced by up to half, thus also saving time which can be exploited in order to increase throughput.

A further substantial increase in throughput is achieved by the embodiment shown in FIG. 2. The elevator 2 and the buffer elevator 4 are equipped with two belts arranged one over the other, the vertical gap of the belts being equal to that of the belt of the intermediate storage. The buffer elevator 4 thus takes a first quantity of product, for example onto its upper belt, and, immediately thereafter, a second quantity of product onto its lower belt. The sequence is unimportant and can also be reversed. The time that is required for the short vertical displacement is almost negligible. After both levels are filled, the products are transferred simultaneously to both levels of the elevator 2, so that the buffer elevator 4 is immediately available again for transferring product and the elevator 2 has time for transporting to the intermediate storage levels, where the two levels are either transferred simultaneously to two levels or successively to one level of the intermediate storage. This expansion of the prebuffer function results in additional time savings which can be exploited in order to increase product throughput.

The product is discharged from intermediate storage in the same manner but in reverse sequence, that is, first from one or two levels of the intermediate storage to the two levels of the discharge-side elevator 3, and from there simultaneously to the two levels of the buffer elevator 5. From there, the products can be transferred at one level to forwarding conveyor belts 9.

Alternatively, the products can be transferred simultaneously on two levels to several forwarding belts 9, 10 which load two packaging devices simultaneously or in a time-staggered manner with product formations as the discharge-side buffer elevator 5 moves to the discharging levels associated with the respective packaging lines and supplies the corresponding packaging lines with product by means of the conveyor devices located on the elevator 5.

To further accelerate the feeding into intermediate storage and the discharging from same, the number of elevator levels can be increased to three, four or more as shown in FIG. 3. The procedure for the filling of the individual levels is the same as with two levels. The expansion to several levels results in manifold reduction of the transfer time of products into intermediate storage (and discharging, accordingly) and thus a multiplication of the throughput.

The prebuffer function can thus be extended (calculated) by means of any number of conveyors of freely selectable length arranged one over the other. Via the incoming conveyor output or speed, the sum of the length of these conveyors located on the buffer elevator 3 results in at least the time required for the above-described work cycle of the elevator 2 to load the buffer levels during continuously incoming production. The belt length of the buffer elevators can be kept short in order to minimize the pickup time and the delivery time. By multiplying the levels in the buffer elevator 3 arranged one over the other and serving as prebuffer conveyors, their length can be added up in order to determine the prebuffering time, thus producing the necessary cycle time for the load cycle of the elevator 2 with the minimum length. Through the simultaneous pickup and delivery of the product formations of the conveyors in the buffer elevator 3 lying one over the other, the time required for this can be derived solely from the length of the individual conveyor.

Through the arrangement of several buffer levels over each other, it is also possible to simultaneously pick up products from several infeed levels arranged one over the other, e.g., from several production lines. As mentioned previously, it is also possible for several discharge levels to be loaded simultaneously on the discharge side in order to supply several packaging lines with product depending on availability and output.

The creation of formations and the gaps between them is performed in a known manner by suitable upstream conveyors and their electrical control (servo technology). These formations can be produced, for example, by a calculable number of conveyors of a calculated length. At higher outputs, a dual pulse noseband known from the prior art is then usually used.

As already described for two elevator levels, several packaging devices can be loaded with product formations during product discharge simultaneously or in a time-staggered manner. Individual packaging lines can also be stopped. Then only the discharge levels are loaded with product that are active and need product. Typically, the overall discharge output, that is, the feed output of all downstream packaging machines, is, for example, 10%-20% greater than the production output. This surplus capacity is correlated with the quantity of product located in the buffer levels (fill level). That is, the higher the fill level of the buffer levels, the higher the discharge output is set in order to prevent overfilling of the buffer levels. The product flow regulator thus reacts flexibly to the availability of the downstream packaging process.

Another advantage of the regulator according to the invention is that, as a result of the arrangement of several levels on the elevators, the overall system can be set up very compactly in terms of length.

The described exemplary embodiment is a device for a production facility for unpackaged products, for which conveyor belts are preferably suitable. As will readily be understood, however, the product flow regulator according to the invention is also suitable for other products, particularly including packaged ones (cartons, packets, etc.). Instead of conveyor belts, other conveyors such as, for example, roller conveyors, chain conveyors, etc., can also be used for that purpose.

In the described preferred exemplary embodiment, the buffer function is carried out by the buffer elevators 4, 5. Instead of elevators for the buffer function, buffer devices 11, 12 that are fixed in their height can also be used, as shown in FIG. 4. If these buffer devices have several levels arranged one over the other, the loading and/or emptying can be done by means of height-adjustable diverting belts or conveyors 13, 14.

The described product flow regulator can be arranged such that the production flow passes through it (inline arrangement). In this arrangement, the product handling is performed according to the "first in first out" (FIFO) principle. Alternatively, there is the so-called "end of line" arrangement, in which the product flow regulator is disposed at the end of the line and the product handling is performed according to the "first in last out" (FILO) principle.

The invention claimed is:

1. A method for decoupling an incoming flow of piece-goods from a downstream device for further processing with stationary intermediate storage with a plurality of store levels and with an infeed-side elevator with one or more transport levels for transferring products incoming on conveyors to an intermediate storage and a discharge-side elevator for removing temporarily stored products and delivery thereof to forwarding conveyors, the method comprising:

arranging a second elevator upstream from the infeed-side elevator which picks up incoming products and delivers them at plural different heights to the infeed-side elevator.

2. A method as set forth in claim 1, further comprising arranging a second elevator downstream from the discharge-side elevator which picks up products removed from the intermediate storage at plural different heights from the discharge-side elevator and delivers them to the forwarding conveyor.

3. A method as set forth in any claim 1, wherein plural transport levels of the second elevator are successively filled on the infeed side and the products are delivered simultaneously to the infeed-side elevator.

4. A method as set forth in claim 2, wherein plural transport levels of the discharge-side elevator are filled simultaneously from the intermediate storage and delivered simultaneously to plural transport levels of the downstream second elevator, after which the products are delivered successively or simultaneously from the individual transport levels of the second elevator to the forwarding conveyors.

5. A method as set forth in claim 2, wherein plural transport levels of the discharge-side elevator are filled simultaneously from the intermediate storage and delivered simultaneously to plural levels of the downstream second elevator, after which the products are delivered from the individual transport levels of the second elevator simultaneously to plural forwarding conveyors.

6. A product flow regulator for decoupling an incoming flow of piece-goods from a downstream device for further processing, comprising:
 a stationary intermediate storage including a plurality of store levels and including an infeed-side elevator including one or more transport levels for transferring products incoming on conveyors to an intermediate storage;
 a discharge-side elevator for removing the temporarily stored products and delivering them to forwarding conveyors; and
 a second elevator arranged upstream from the infeed-side elevator for picking up incoming products and for transferring them to the infeed-side elevator at plural different heights.

7. A product flow regulator as set forth in claim 6, further comprising a second elevator arranged downstream from the discharge-side elevator for picking up products removed from the intermediate storage from the discharge-side elevator at plural different heights and delivering them to the forwarding conveyors.

8. A product flow regulator as set forth in any claim 6, wherein the second elevator arranged upstream from the infeed-side elevator includes plural levels of fixed height and a distributing device, the products being distributable by the distributing device from the conveyors to the plural levels of fixed height.

9. A product flow regulator as set forth in claim 7, wherein the second elevator arranged downstream from the discharge-side elevator is an elevator.

10. A product flow regulator as set forth in claim 7, wherein the second elevator arranged downstream from the discharge-side elevator includes levels of fixed height and a distributing device, the products being distributable by the distributing device from the plural levels of fixed height to the forwarding conveyors.

11. A product flow regulator as set forth in claim 6, wherein the elevators include one or more transport levels arranged one over the other.

* * * * *